United States Patent
Bacon, Jr.

(10) Patent No.: US 6,548,164 B1
(45) Date of Patent: Apr. 15, 2003

(54) REMOVABLE SHEETING

(75) Inventor: Chester A. Bacon, Jr., Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/553,081

(22) Filed: Apr. 19, 2000

Related U.S. Application Data

(60) Provisional application No. 60/141,593, filed on Jun. 30, 1999.

(51) Int. Cl.[7] .................. G02B 5/128; G02B 5/124; C09J 7/02; E01F 9/04
(52) U.S. Cl. .............. 428/343; 359/529; 359/530; 359/538; 428/203; 428/204; 428/325; 428/354; 428/913
(58) Field of Search ................. 359/529, 530, 359/538; 428/343, 354, 325, 913, 203, 204

(56) References Cited

U.S. PATENT DOCUMENTS

| | | | |
|---|---|---|---|
| 2,407,680 A | 9/1946 | Palmquist et al. ............. 88/82 |
| 3,222,204 A | 12/1965 | Weber et al. ................ 117/27 |
| 3,681,179 A | 8/1972 | Theissen | |
| 3,684,348 A | 8/1972 | Rowland ................... 350/103 |
| 3,700,305 A | 10/1972 | Bingham ................... 350/105 |
| 4,348,312 A | 9/1982 | Tung ....................... 428/144 |
| 4,367,920 A | 1/1983 | Tung et al. ................ 350/105 |
| 4,505,967 A | 3/1985 | Bailey ...................... 428/164 |
| 4,664,966 A | 5/1987 | Bailey et al. ............... 428/203 |
| 4,673,354 A | 6/1987 | Culler .................... 433/217.2 |
| 4,716,194 A | * 12/1987 | Walker et al. .............. 524/806 |
| 4,721,649 A | 1/1988 | Belisle et al. .............. 428/325 |
| 4,801,193 A | 1/1989 | Martin ..................... 350/103 |
| 5,045,569 A | 9/1991 | Delgado ..................... 521/60 |
| 5,053,436 A | 10/1991 | Delgado ..................... 521/64 |
| 5,200,262 A | * 4/1993 | Li ........................... 428/266 |
| 5,250,085 A | 10/1993 | Mevissen .................... 51/298 |
| 5,450,235 A | 9/1995 | Smith et al. ............... 359/529 |
| 5,451,447 A | * 9/1995 | Li ........................... 428/143 |
| 5,491,586 A | 2/1996 | Phillips ................... 359/530 |
| 5,514,441 A | 5/1996 | Pohto et al. ................. 428/72 |
| 5,614,286 A | 3/1997 | Bacon, Jr. et al. .......... 428/161 |
| 5,632,946 A | 5/1997 | Bacon, Jr. et al. .......... 264/212 |
| 5,642,222 A | 6/1997 | Phillips ................... 359/530 |
| 5,679,435 A | 10/1997 | Andriash ................... 428/137 |
| 5,691,846 A | 11/1997 | Benson, Jr. et al. ......... 359/530 |
| 5,812,317 A | * 9/1998 | Billingsley et al. ......... 359/536 |
| 5,824,390 A | 10/1998 | Ochi et al. ................ 428/143 |
| 5,840,406 A | 11/1998 | Nilsen ..................... 428/156 |
| 6,172,810 B1 | * 1/2001 | Fleming et al. ............. 359/529 |

FOREIGN PATENT DOCUMENTS

| | | |
|---|---|---|
| EP | 0 224 795 A2 | 6/1987 |
| EP | 0 481 634 A1 | 4/1992 |
| EP | 0 570 515 | 6/1996 |
| WO | WO 92/13924 | 8/1992 |

\* cited by examiner

*Primary Examiner*—Daniel Zirker
(74) *Attorney, Agent, or Firm*—Carolyn A. Fischer

(57) ABSTRACT

The present invention provides improved and novel removable sheeting, having a specular reflective layer, and a pressure sensitive adhesive layer adjacent the specular reflective layer. The adhesive layer of this sheeting includes an organofunctional coupling agent. In preferred embodiments the sheeting is retroreflective and further includes an array of retroreflective elements.

22 Claims, 2 Drawing Sheets

REMOVABLE SHEETING

CROSS-REFERENCE TO RELATED APPLICANT

This application claims priority to U.S. Provisional Patent Application No. 60/141,593, filed Jun. 30, 1999.

FIELD

This invention relates to highly reflective, highly durable, retroreflective and reflective sheeting constructions which preferably comprise a layer of pressure sensitive adhesive (containing an organofunctional coupling agent) adjacent a specular reflective layer.

BACKGROUND

A number of retroreflective and reflective sheeting products have been marketed, e.g., for use in road signs, advertising signs, conspicuity sheeting, etc. A typical example of a retroreflective sheeting is characterized by a single layer of tiny transparent microspheres embedded in a thermoset polymeric bead bond layer which is backed by an optional transparent spacing layer and a specularly reflective layer and an adhesive. One such sheeting is known as "enclosed-lens"sheeting and was first taught by Palmquist, U.S. Pat. No. 2,407,680, which is herein incorporated by reference. Other such sheeting are described in U.S. Pat. Nos. 4,664,966 (Bailey) and 4,721,649 (Belisle), which are herein incorporated by reference. Such sheeting has been sold commercially for many years in large volume and to the general satisfaction of its users.

Despite this general satisfaction, there has been a desire for an improvement in certain properties of the sheeting. For example, it is sometimes desired to produce retroreflective sheeting which is cleanly removable from a substrate. Traffic control, safety identification and delineation, or commercial advertising uses of reflective sheetings have inherent costs for the materials and the labor required in the initial applications. Should these initial applications require modification or changes over time due to new traffic laws or safety conditions, expiration of intended use or warranties, or new trends in advertising and consumer awareness, the replacement and environmental costs often compound considerably with each renewed application. Additional material and labor costs must be expended to expose, clean, resurface, or replace the substrate. These procedures not only consume time and obvious resources, but also involve considerable energy use, may produce undesired volatile emissions, and produce waste disposal problems.

It would be highly desirable to provide sheeting that is cleanly removable from a substrate and which may be removed at low cost.

SUMMARY

The present invention provides improved and novel removable sheeting, having a specular reflective layer, and a pressure sensitive adhesive layer adjacent the specular reflective layer. The adhesive layer of this sheeting includes an organofunctional coupling agent. In preferred embodiments the sheeting is retroreflective and further includes an array of retroreflective elements.

The retroreflective sheeting of the present invention has improved removability properties over the retroreflective sheeting of the prior art. Suitable removable sheetings of the present invention are capable of a broad range of temporary (typically less than two years of intended application before removal) to permanent (i.e., long term applications spanning several years) adhesion properties. Suitable sheetings include a pressure sensitive adhesive layer containing an organofunctional coupling agent (e.g., an organofunctional silane compound) adjacent a specular reflective layer. The adhesive system preferably forms an integral and inseparable structure on the sheeting, whereby clean and complete post application removal is possible, preferably even after long periods of time or climatic exposure. When used on retroreflective sheeting, the sheeting to substrate adhesion values are preferably such to resist environmental, aging, and pressure washing forces.

In preferred embodiments, only simple hand peel forces are required to continuously remove a reflective sheeting. As a result, replacement programs experience significant cost and environmental advantages. More preferably, the surface of a substrate is exposed and unharmed to its original finish in a minimum of time and with little effort. Heat or cold shock treatments, scrapping utensils, solvent or cleaning fluid applications, and manpower and energy investments to remove the sheeting or adhesive residue are preferably no longer required. Also avoided or eliminated as being unnecessary are finish restoration by-products and wastes such as solvents, cleaning fluids, contaminated containers and rags. Repainting due to scratched or degraded finishes is also avoided.

The sheeting of the present invention may be used to form a wide variety of articles, including, for example, retroreflective identification and signage for temporary markings (e.g., construction work zones and detour routes), retroreflective and reflective identification sheeting for use on vehicles (e.g., decals on police or fire vehicles and die cut alpha-numerics removed from pre-applied reflective license plates), retroreflective and reflective identification and advertising sheeting for use on vehicles (e.g., commuter buses, taxi cabs, delivery trucks, and heavy and long vehicles and their trailers), retroreflective and reflective advertising sheeting for stationary applications (e.g., store fronts, mail and package drop boxes, and real estate for sale signs).

DETAILED DESCRIPTION

The removable sheeting of the present invention has a specular reflective layer and a pressure sensitive adhesive layer adjacent the specular reflective layer. The adhesive layer of this sheeting includes an organofunctional coupling agent. The sheeting may be reflective and/or retroreflective. In preferred embodiments the sheeting is retroreflective and further includes an array of retroreflective elements.

It is contemplated that the sheeting of the present invention may be printed with one or more layers of an ink or other compound in order to provide a graphic image, e.g., a printed message or machine readable image. These optional layers (which may be discontinuous) may be provided on the outside surface of the sheeting (e.g., on the top coat of the sheeting) or may be contained or formed within the sheeting itself.

In one embodiment of the present invention the sheeting is of the "enclosed lens" type. Enclosed lens sheetings (see, e.g., FIG. 1) generally include an adhesive layer, a specularly reflecting layer adjacent the adhesive layer, an optional spacing layer, a monolayer of lenses, and a bead bond layer. Additional optional layers typically include a top coat layer. Sheeting of the enclosed lens type (but without the particular composition and features of the sheeting of the present invention) are described in U.S. Pat. Nos. 4,367,920 (Tung), 4,505,967 (Bailey), 4,664,966 (Bailey), 4,721,649 (Belisle) and 5,514,441 (Pohto), which are herein incorporated by reference. Another suitable enclosed lens type sheeting is illustrated in FIG. 2.

In another embodiment of the present invention the sheeting is of the prismatic (e.g., "cube corner" formation) type which has a reflective coating thereon. See, e.g., FIG. 3. These sheetings generally include a plurality of microretroreflective formations or elements on one surface of a sheet which have a specular reflective layer (e.g., a metallic material) attached to the facet sides. Suitable sheetings of this type, but without the features of the present invention, are disclosed in U.S. Pat. Nos. 3,684,348 (Rowland), 4,801,193 (Martin), 5,450,235, 5,491,586 (Phillips), 5,614,286 (Bacon) 5,632,946 (Bacon), 5,642,222 (Phillips), 5,691,846 (Benson), and 5,840,406, which are herein incorporated by reference.

Without being bound by theory, the improved properties of the sheeting are believed to be due to the enhanced integrity of the bond between the adhesive layer and the specular reflector layer, thereby permitting clean removal from a substrate without cohesive failure of the adhesive layer.

Figure 1:
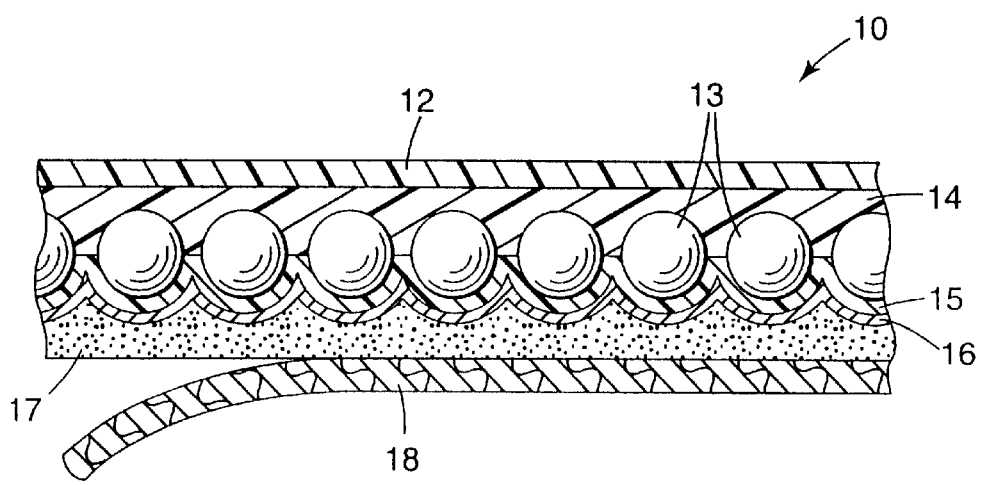
FIG. 1 is an enlarged sectional view through an enclosed-lens type retroreflective sheeting made according to the present invention.
Figure 2:
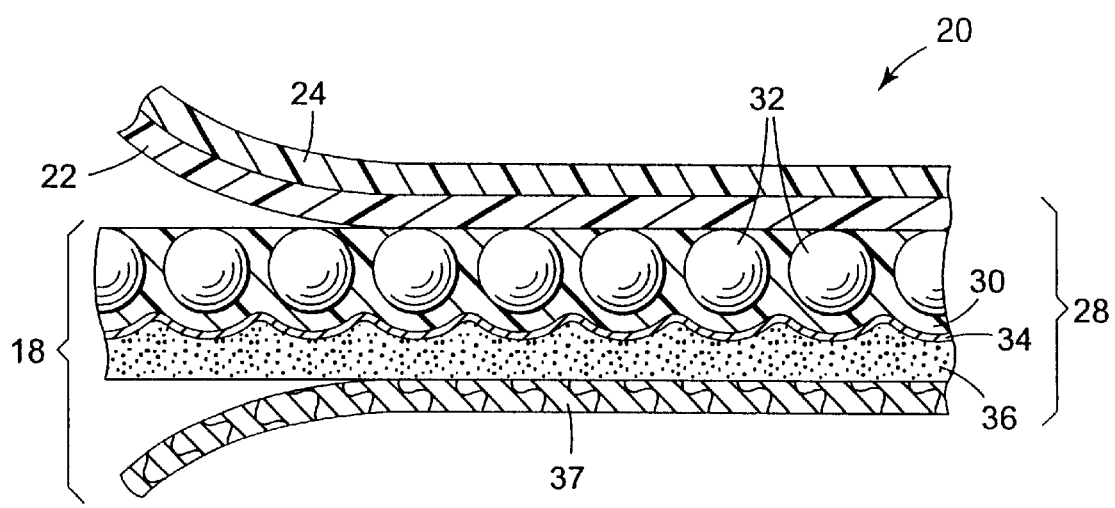
FIG. 2 is an enlarged sectional view through an alternative enclosed-lens type retroreflective sheeting made according to the present invention.

FIG. 1 illustrates enclosed lens type retroreflective sheeting of the present invention. The structure of the sheet 10 preferably includes: an optional light transmissible topcoat layer 12, a monolayer of light transmissible microsphere lenses 13, typically glass beads, embedded in a light transmissible bead bond layer 14; an optional light transmissible space coat or spacing layer 15 preferably applied to the back surfaces of the microsphere lenses in such a way as to follow the curved surface of the back of the microsphere lenses; a specularly reflective layer 16 (e.g., vapor or chemically deposited on the spacing layer); and a layer of adhesive 17 covering the specularly reflective layer. If desired, the topcoat layer 12 and the beadbond layer 14 may be one material or a single layer.

Light rays incident on the sheeting travel through the topmost layers (e.g., 12 and 14) to the microspheres 13, which act as lenses focusing the incident light approximately onto the appropriately spaced specularly reflective layer 16. Thereupon the light rays are reflected back out of the sheeting along substantially the same path as they traveled to the sheeting. The various layers illustrated in FIG. 1 will be described with greater detail below, however, it is understood that the layers may be modified within the scope of the present invention.

Retroreflective sheeting made according to the method of the present invention reflects most brightly when the topcoat 12, bead bond layer 14, and spacer layer 15 are uncolored and clear, in which case the sheeting will generally have a white appearance. However, colored sheeting can be prepared, for example, by placing dyes or transparent pigments in or on one or more of the space coat 15, bead bond layer 14, or topcoat layer 12. Colored sheeting may also be prepared using colored glass beads, e.g., beads made from colored metal oxides.

Light transmissive topcoat 12 is optional and preferably provides an abrasion resistant, weatherproof protective covering underlying layers to maintain light transmission and preserve the optical path lengths for retro-reflection. Topcoat 12 is preferably the same polymer that forms the bead bond layer 14, described in more detail below. Suitable transparent polymer-based materials for use in topcoat 12 include polymers or copolymers of ethylene or propylene, polyesters, acrylic polymers and copolymers, vinyls (e.g., plasticized polyvinyl chloride polymers), urethanes, and urea components. Preferably topcoat 12 is between about 0.01 and 0.25 mm thick. More preferably, topcoat 12 is between about 0.02 and 0.05 mm thick.

Bead bond layer 14 is adjacent to and on the front or incoming light side of the microspheres. Bead bond layer 14 is preferably a light transmissive polymeric layer to form a substantially stable and insoluble layer. Suitable materials include those materials described above for the topcoat layer. Preferred materials include urethane extended polyesters, and urea and/or urethane components. If desired, the bead bond and top coat layers may comprise a single layer.

As discussed in U.S. Pat. No. 4,721,649 (Belisle), bead bond layer 14 may be prepared by thermally setting a homogeneous coating composition comprising: (a) a polymeric compound which has isocyanate groups incorporated therein, a substantial portion of the free isocyanate groups being blocked, masked or joined to substituents that can be removed by heating; and (b) a crosslinking agent for the isocyanate groups, or a catalyst which provides the isocyanate groups with the ability to crosslink with other isocyanate groups when heated.

One preferred method of preparing an uncured homogeneous bead bond composition comprises the steps of: (a) providing an isocyanate-functional polymeric compound, which is either isocyanate terminated, or has isocyanate groups incorporated therein, wherein a substantial portion of the isocyanate groups are either blocked, masked, or joined to substituents or agents that can be removed by heating; (b) adding a crosslinking agent, preferably a crystalline polyol crosslinking agent, to the masked isocyanate-functional polymeric compound and allowing this mixture to react at an elevated temperature for a period of time which is sufficient to drive off no more than about one-third of the substituents which can be removed by heating, in order to partially react the crosslinking agent and the isocyanate-functional polymer; and (c) maintaining the reaction at the elevated temperature until a homogeneous coating composition results. The resultant homogeneous coating composition may be cooled to room temperature and stored, or may be used immediately.

The thickness of the bead bond layer 14 is preferably between 0.005 and 0.08 mm thick. More preferably, bead bond layer 14 is between 0.01 and 0.05 mm thick.

The refractive index of the bead bond layer may be adjusted according to conventional practices. By way of example, the refractive index of this layer when it is adjacent to the front sides of 2.26 refractive index glass bead microspheres is typically and approximately 1.5. It should be noted that use of lower refractive index bead bonds (e.g., polytetrafluoroethylene bead bonds having 1.35 refractive index) will change the refractive index and optical path length requirements of the microsphere and/or space coat layers.

Suitable transparent microsphere lenses 13 for use in the present invention include glass beads that typically do not exceed about 200 microns in diameter, and should preferably be between 20 and 120 microns in diameter, most preferably between 50 and 90 microns. In general, the narrower the range of diameters, the more efficient and brighter will be the retro-reflective properties. The preferred size distribution from the mean bead diameter should be plus or minus 10 microns. The most preferred size distribution from the mean bead diameter is plus or minus 7.5 microns.

For enclosed lens type sheeting, the refractive index of the glass beads is suitably between about 1.5 and 2.8. The refractive index is preferably between 2.0 and 2.3, more preferably between 2.2 and 2.3, and optimally about 2.26 when adjacent to bead bond materials with approximately 1.5 refractive index. It should be noted that as described in U.S. Pat. No. 4,348,312 (Tung) if the bead bond layer directly in front of the microsphere lenses is of a lower refractive index (e.g., 1.44 by the combination of acrylate copolymer and vinylidene fluoride copolymer) the microsphere lenses are then more preferably about 2.73 refractive index. This combination would typically cause the elimination of spacing layer 15, with the reflector layer 16 then being in direct contact with the rear of the microsphere lenses 13

Chemical treatment of bead surfaces may be utilized as known in the art to enhance resin to glass adhesion. Additionally, fluorocarbon treatment of the glass beads can aid in achieving hemispherical bead sinkage and obtaining uniform bead sinkage, as disclosed in U.S. Pat. No. 3,222,204 (Weber), which is herein incorporated by reference.

As previously discussed, space coat 15 is optional. When used, space coat 15 preferably comprises polyvinyl butyral, or acrylic crosslinked with either urea formaldehyde or melamine formaldehyde. The thickness of the space coat 15 will depend on the ratio of the index of refraction of the microspheres to the index of refraction of the bead bond or bead bond/topcoat layer, and the diameter of the microspheres. The space coat preferably is sufficiently thick so as to position the specularly reflective layer 16 at the approximate focal plane for light rays passing through the microspheres. In some cases, through an appropriate combination of high-index microspheres and low index clear coat and topcoat layers, no spacing layer is needed, and a specularly reflective layer may be applied directly to the microspheres. However, a space coat 15 is normally present, and is generally between about 0.01 and 0.03 mm thick.

As illustrated in FIG. 1, reflective layer 16 underlies the optional space coat 15. (In the event no space coat is used, reflective layer 16 would underlie microsphere lenses 13.) Suitable underlying reflecting means include uniformly-thick metallic deposits such as silver, aluminum, tin, etc., by means of vapor, chemical, or other suitable disposition method. If desired, instead of forming the reflective layer from metal, dielectric coatings can be used as taught in U.S. Pat. No. 3,700,305 (Bingham), which is herein incorporated by reference. The thickness of reflective layer 16 depends upon the particular material used and for metals such as aluminum is preferably between about 50 and 120 nm.

The sheetings of the present invention have an adhesive layer next to the aforementioned specular reflective layer (e.g., a metalized or dielectric layer). Surprisingly, incorporating a suitable coupling agent (e.g., an organofunctional silane) into the adhesive formulation can make dramatic improvements in the adhesive bond to this layer. The following discussion of the adhesive layer is meant to apply to all embodiments of the present invention, not merely the embodiment depicted in FIG. 1.

Adhesive layer 17 is preferably a pressure-sensitive adhesive, more preferably an acrylate-containing pressure sensitive adhesive.

In preferred embodiments, adhesive layer 17 is between about 0.01 mm and 0.12 mm thick. In one method of manufacture the adhesive is coated onto a release-coated paper or polymer film backing 18, and then laminated to reflective layer 16. Alternatively, the adhesive may be applied directly to the reflective layer 16 and an optional release-treated paper or polymer film backing 18 laminated to the adhesive layer 17, to complete the retroreflective product.

Preferred sheetings of the present invention may be characterized as "removable sheetings." The adhesive layer 17 of the present invention preferably provides a "detachable link" for clean and continuous removal of the applied sheeting. In more preferred sheetings the adhesive failure between the sheeting and a substrate occurs before cohesive failure of the adhesive (which would result in adhesive residue being left on the substrate) and before cohesive failure of the sheeting (which would result in only partial removal of the sheeting form the substrate). As a result the preferred sheeting of the present invention can be cleanly removed from a substrate.

Pressure sensitive adhesives have been used extensively for bonding sheeting (e.g., thin sheet, film, or foils) to a substrate. Several factors dictate whether the bonding is considered "permanent" or "removable." For example, the integrity of the film or backing layer of the sheeting, the bond strength of the adhesive layer to the backing layer, and/or the bond strength of the adhesive to the substrate dictate how well an article will adhere to a substrate and/or what condition the article will be in when it has been removed from the substrate. Permanent adhesives on reflective sheetings have been empirically defined by either the sheeting or substrate being severely damaged in a removal process.

In preferred embodiments, the present invention provides removable reflective sheetings with adhesion and sheeting integrity exceeding 0.3 kg/cm width when a 2.5 cm strip is peeled at a rate of 30 cm/minute and at a 90 degree angle. More preferably the sheeting exceeds 0.4 kg/cm and most preferably the sheeting exceeds 0.5 kg/cm when so tested. Sheeting of the present invention (e.g., reflective, glass beaded or prismatic retroreflective sheetings) preferably have sufficient integrity (e.g., sufficient thickness of the polymeric layers, or internal structural integrity) to meet converting, handling, and application requirements. Preferred sheetings of the present invention generally have at least one tear resistant film or polymeric layer or laminate of layers of at least 0.025 mm thickness. Suggested materials for this layer or laminate of layers can include but are not limited to polyvinylchlorides, polyvinylbutyral, polyolefins, polyurethanes, polyesters, and polycarbonates. Other typical polymeric materials may also be used as desired.

The adhesive formulation may include a defoamer. Suitable defoamers include those under trade designations "Foamaster JMY" commercially available from Henkel, Charlotte, N.C. and "Surfynol DF-70" commercially available from Air Products and Chemicals, Inc., Allentown, Pa.

In more preferred embodiments, optional acrylate polymer microspheres are incorporated into the adhesive formulation. Such formulation can often provide further improvements in the adhesive to substrate removability. Preferred adhesive systems for use in the present invention are described in U.S. Pat. No. 5,045,569 (Delgado) and EP 0 570 515 (Steelman), which are herein incorporated by reference. One such adhesive system includes a blend of an acrylate PSA latex solution and an acrylate microsphere solution.

Suitable polymer microspheres comprise at least 85 parts by weight of at least one alkyl acrylate or alkyl methacrylate ester together with up to 15 parts by weight of at least one polar monomer. Preferably, a majority of such polymer microspheres have one or more interior voids containing a central cavity at least 10%, and most preferably 30%, of the diameter of the polymer microsphere itself. An aqueous suspension of such hollow polymer microspheres can be prepared by emulsification processes. In one "two-step" process, the microspheres are prepared by forming a water-in-oil-in-water emulsion by dispersing the first emulsion into an aqueous phase; followed by initiating polymerization, preferably by the application of heat or radiation can prepare them. In an alternative "one-step process, aqueous suspensions of such polymer microspheres which contain moderately ionized polar monomers may be prepared by the aqueous suspension polymerization of at least one alkyl acrylate or methacrylate ester monomer and at least one non-ionic polar monomer in the presence of at least one emulsifier capable of producing a water-in-oil emulsion inside the droplets, which is substantially stable during polymerization. Both methods produce an aqueous suspension of monomer droplets which upon polymerization become polymer microspheres, the majority of which contain at least one interior cavity as discussed above.

One suitable such aqueous pressure sensitive adhesives may be prepared as follows: A split-resin flask of 2000 ml. capacity is fitted with a variable speed agitator, condenser, purging tube for introducing nitrogen, and a recording controller. The following materials are added to the flask while purging same with nitrogen: 404 grams distilled water; 1.50 grams sodium dodecylbenzene sulfonate; 435 grams isooctyl acrylate; 60 grams N-tert-octylacrylamide; 0.60 gram sodium bicarbonate; and 5.0 grams sodium styrene sulfonate. (The solid N-tert-octylacrylamide is dissolved in the isooctyl acrylate before adding to the flask.) The nitrogen purge is continued until the end of the run. The flask and its contents are heated to 50° C., at which temperature an initiator charge of 0.05 gram potassium persulfate and 0.0125 gram sodium metabisulfite is added. The reaction temperature is held at 50° C. for approximately 24 hours to complete the polymerization. The resulting latex would have no coagulum and the solids content would be approximately 54%.

Other suitable PSAs may be employed. For example, Gelva 2397 (available from Monsanto) may be used.

The adhesive system suitably comprises between 0 and 90 wt. % microspheres (based on the weight of solids in the adhesive); preferably between 0 and 50 wt. %; more preferably between 10 and 40 wt. %; and most preferably between 20 and 30 wt. %.

An organofunctional coupling agent (e.g., a silane coupling agent) is present in the adhesive compositions of the present invention in an amount sufficient to accomplish the goal of rendering a suitable removable adhesive article. Suitable coupling agents include silanes, aluminates, zircoaluminates, zirconates, and titanates coupling agents. Silane coupling agents are preferred in many cases, in part because of their lower cost and wider availability. The coupling agent can be ionic or nonionic or a combination thereof and can be monomeric, oligomeric or polymeric. Ionic coupling agents include anionic, cationic and zwitterionic coupling agents.

Preferred silane coupling agents have the general formula:

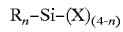

$$R_n\text{-Si-}(X)_{(4-n)}$$

Wherein R is an organofunctional group and X is a hydrolyzable group. Suitable such organofunctional groups R include, for example, vinyl, epoxy, acrylate or methacrylate, amine, mercapto, or styryl groups. Many other functional groups can be used, if desired, depending on the particular adhesive system being employed. Suitable such hydrolyzable groups include alkoxy, acyloxy, amine, or chlorine . Other suitable hydrolyzable groups may be employed if desired.

Suitable coupling agents include (3-glycidoxypropyl)trimethoxysilane, 3-mercaptopropyltrimethoxysilane, 3-aminopropyltriethoxysilane (gamma-aminopropyltriethoxysilane commercially available from Union Carbide Corp. under the trade designation "A-1100"), 3-aminopropyltrimethoxysilane, 3-methacryloxypropyltrimethoxysilane, and vinyltrimethoxysilane. Other useful nonionic silanes include those listed in Column 5 lines 1–17 of U.S. Pat. No. 4,673,354, which is herein incorporated by reference.

For preferred water-based acrylate microsphere adhesive systems, the preferred organofunctional silane is (3-glycidoxypropyl)trimethoxysilane or 3-mercaptopropyltrimethoxysilane. Most preferably the coupling agent is added to the adhesive composition just prior to coating the composition on the sheeting.

Ionic silanes which may be useful in the practice of the invention include N-(3-trimethoxysilylpropyl)-N-methyl-N,N-diallyl ammonium chloride, available under the trade designation "T2909.7", trimethoxysilylpropylisothiouronium chloride, available under the trade designation "T2921", N-trimethoxysilylpropyltributylammonium bromide, available under the trade designation "T2924", and N-trimethoxysilylpropyl-N,N,N-trimethylammonium chloride, available under the trade designation "T2925", all from Petrarch Chemical Co., Inc.

Preferably, the coupling agent is present in a range of between 0.25 to 3% by weight based on the weight of solids in the adhesive, more preferably the coupling agent is present in a range between 1 and 3% by weight. Pigmented adhesives typically are formulated with an amount of coupling agent nearer the higher level of this range.

Although silane coupling agents are known to promote adhesion between organic and inorganic materials, the incorporation into a pressure sensitive adhesive is believed to be new. The incorporation of a coupling agent provides an unexpected result of enhanced bond to a specular reflective layer. This result provides improved removability of the article.

The combination of an acrylate adhesive with a silane coupling agent to retroreflective sheetings having a specular reflective layer produces new and unique properties for removability. The sheeting can be stripped off after climatic exposure or accelerated aging without disrupting the specular reflective layer or leaving adhesive residue on the substrate. For example, when this adhesive system with silane coupling agent was used on an enclosed lens retroreflective sheeting, good adhesion properties were achieved exceeding 0.3 kg/cm width when a 2.5 cm strip is peeled at a rate of 30 cm/minute and at a 90 degree angle and the sheeting resisted edge lifting under pressure washing. The sheeting also exhibited good removability properties. Preferred removable sheeting has an adhesion value less than about 0.9 kg/cm width when a 2.5 cm strip is peeled at a rate of 30 cm/minute and at a 90 degree angle. More preferably the sheeting adhesion value is less than 0.75 kg/cm and most preferably is less than 0.6 kg/cm when so tested. No adhesive residue remained on the substrate and the sheeting did not delaminate.

One typical procedure for making the enclosed-lens structure of FIG. 1 comprises the steps of:
  (1) Applying transparent topcoat 12 onto a smooth-surfaced release liner (not shown), e.g., by coating, extrusion, laminating, or spraying;
  (2) Applying a layer of an uncured polymeric bead bond composition 14 onto topcoat 12;
  (3) Applying a monolayer of transparent microsphere lenses 13 to the uncured bead bond layer 14;
  (4) Setting the bead bond layer 14;
  (5) Covering the exposed portions of the microspheres 13 with spacer layer 15 having an exterior surface cupped around the microspheres;
  (6) Applying a specularly reflective layer 16 to the cupped surface of the spacer layer 15, typically by vapor-deposition techniques;
  (7) Applying an adhesive layer 17, in typical embodiments, over the specularly reflective layer 16, the adhesive layer having an organofunctional coupling compound;
  (8) Covering the adhesive layer 17 with a removable liner 18; and
  (9) Stripping away the smooth-surfaced release liner from the transparent topcoat 12.

While the above is the typical method of preparing enclosed-lens type retroreflective sheeting material, other well-known methods of preparing the sheeting are also contemplated. One such contemplated sheeting is as described in U.S. Pat. No. 4,664,966 (Bailey).

An alternative enclosed-lens type sheeting of the present invention is illustrated in FIG. 2. With the exception of the adhesive layer, sheeting of this type is described in U.S. Pat. No. 4,664,966, which is herein incorporated by reference. Sheeting 28 comprises: retroreflective base material 18 having a binder layer 30 (analogous in some respects to the spacing layer 15 of FIG. 1) containing a monolayer of glass microspheres 32 (see discussion of microsphere lenses 13 of FIG. 1), a specularly reflective layer 34 (see discussion of layer 16 of FIG. 1), an adhesive layer 36 (see discussion of layer 17 of FIG. 1), a removable liner 37 (see discussion of layer 18 of FIG. 1) and cover film 22. If desired, cover film 22 (analogous in some respects to the top coat layer 12 of FIG. 1) may be applied to base material 18 using a disposable carrier web 24.

Figure 3:
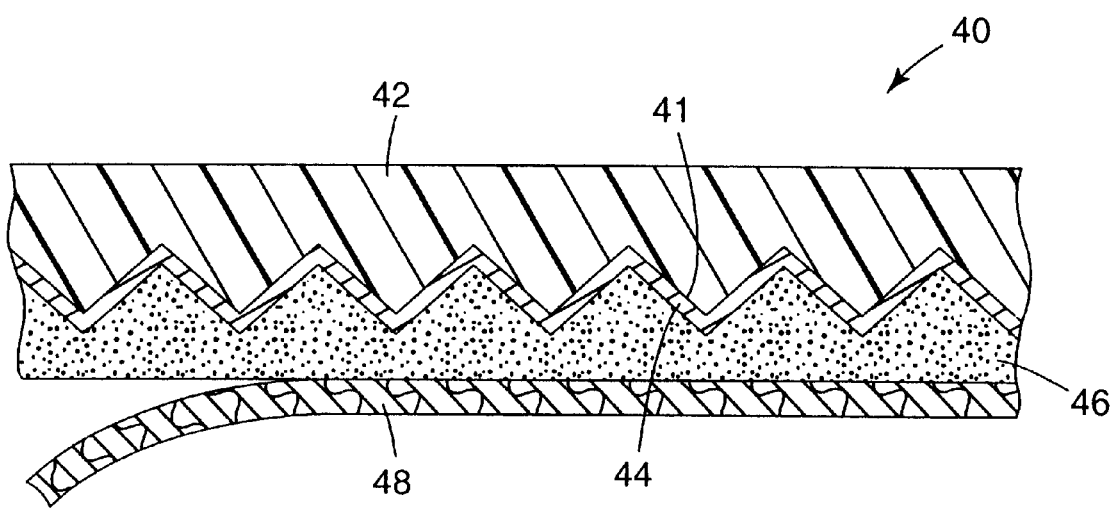
FIG. 3 is an enlarged sectional view through a prismatic (e.g., cube corner) type retroreflective sheeting made according to the present invention.

An alternative prismatic-type sheeting of the present invention is illustrated in FIG. 3. With the exception of the adhesive layer, sheeting of this type is described in U.S. Pat. No. 4,801,193 (Martin), which is herein incorporated by reference. The structure of the sheet 40 preferably includes: a layer of prismatic sheeting 42 that includes an array of retroreflective elements 41, typically cube corners; a specularly reflective layer 44 (see discussion of layer 16 of FIG. 1); and a layer of adhesive 46 covering the specularly reflective layer. If desired, the adhesive layer 46 may be covered with an optional release-coated paper or polymer film backing 48.

Figure 4:
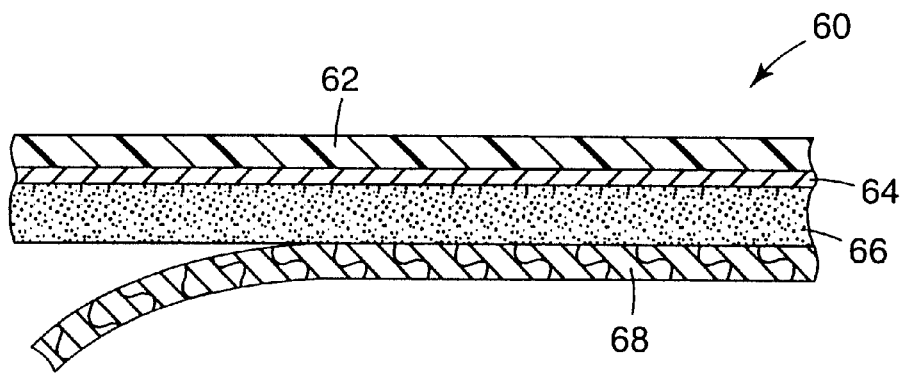
FIG. 4 is an enlarged sectional view through a reflective sheeting made according to the present invention.

A further alternative embodiment of the present invention, a reflective-type sheeting, is illustrated in FIG. 4. The structure of the reflective sheet 60 preferably includes: a backing layer 62 of a suitable light transmissive material, preferably a polymeric layer; a specularly reflective layer 64 (see discussion of layer 16 of FIG. 1); and a layer of adhesive 66 (see discussion of layer 17 of FIG. 1) covering the specularly reflective layer 64. If desired, the adhesive layer 66 may be covered with an optional release-coated paper or polymer film backing 68.

Additional description of the present invention is provided by the following exemplary preparation of retroreflective sheetings. Unless otherwise indicated all parts and percentages are by weight.

EXAMPLES

Example 1

An adhesive formulation is prepared as follows. Acrylate microspheres were prepared as described in Example 1 of European Pat. No. 0 570 515 B1 (Delgado), which is herein incorporated by reference. 43.3 parts of the acrylate microsphere solution were charged to a mixing vessel. Mixing in the vessel was initiated and 0.1 parts antifoaming agent (available under the trade designation "Foamaster JMY" from Henkel, Charlotte, N.C.) was charged. Next, 50 parts latex acrylate pressure sensitive adhesive solution (56.5% solids in water) was charged and allowed to mix until uniform. One part latex thickening component (available under the trade designation "Acrysol ASE 60", 28% solids, from Rohm and Haas, Philadelphia, Pa.) was charged and mixed, followed by approximately 0.3 parts ammonia hydroxide (in 4.3 parts distilled water) to adjust the pH of the adhesive between 6 and 7. Finally, to this mixture, 0.8 parts (3-glycidoxypropyl)trimethoxysilane was charged to complete the final adhesive composition suitable for coating.

The above formulation is approximately 40% by weight solids, and the addition of the organofunctional silane is approximately 2% by weight based on the weight of the solids. Complete and rapid drying of the adhesive is preferred, so as to prevent sequent degradation of the specular reflective layer. If desired, pH adjustment or neutralization, corrosion inhibitors, or alternative thickening agents may be employed.

The following tables (Table 1a and 1b) illustrate an initial drop in adhesion to an aluminum substrate with the silane addition, but accelerated heat aging achieved very comparable results to the untreated adhesive.

TABLE 1a

| Run | % Silane | Adhesive Dry Coating Weight (cm$^2$) |
| --- | --- | --- |
| C1 | 0 | 0.028 |
| C2 | 0 | 0.039 |
| C3 | 0 | 0.050 |
| C4 | 0 | 0.060 |
| C5 | 0 | 0.071 |
| 6 | 2 | 0.028 |
| 7 | 2 | 0.039 |
| 8 | 2 | 0.050 |
| 9 | 2 | 0.060 |
| 10 | 2 | 0.071 |
| 11 | 2 | 0.059 |
| 12 | 2 | 0.070 |
| 13 | 2 | 0.083 |
| 14 | 2 | 0.100 |
| 15 | 2 | 0.105 |
| 16 | 2 | 0.116 |

An adhesive layer was placed in contact to a specular reflective layer of a sheeting as described herein and tested as follows for adhesive transfer to the substrates. Adhesion striping values were tested at 90° to the panels at a rate of 30 cm/min.

TABLE 1b

| Run | Condition: 23° C., 50% RH, 7 day kg/cm | Adh. fail to | Condition: 65.5° C., 7 day kg/cm | Adh. fail to | Condition: Florida, 5° incline, 6 Months Adh. fail to | Condition: Arizona, 45° incline, 6 Months Adh. fail to |
|---|---|---|---|---|---|---|
| C1 | 0.52 | reflective layer | 0.43 | Reflective layer | | |
| C2 | 0.64 | reflective layer | 0.58 | Reflective layer | | |
| C3 | 0.68 | reflective layer | 0.61 | Reflective layer | reflective layer | reflective layer |
| C4 | 0.69 | reflective layer | 0.63 | Reflective layer | | |
| C5 | 0.70 | reflective layer | 0.64 | Reflective layer | reflective layer | reflective layer |
| 6 | 0.35 | pane[1] | 0.40 | panel | | |
| 7 | 0.41 | panel | 0.45 | panel | | |
| 8 | 0.42 | panel | 0.51 | panel | panels[2] | panels |
| 9 | 0.45 | panel | 0.55 | panel | | |
| 10 | 0.48 | panel | 0.63 | panel | panels | panels |
| 11 | 0.41 | panel | 0.51 | panel | panels | panels |
| 12 | 0.45 | panel | 0.57 | panel | | |
| 13 | 0.48 | panel | 0.60 | panel | panels | panels |
| 14 | 0.52 | panel | 0.66 | panel | | |
| 15 | 0.55 | panel | 0.70 | panel | panels | panels |
| 16 | 0.60 | panel | 0.73 | panel | | |

[1] The "panel" listed in this table were cleaned and degreased aluminum.
[2] The outdoor "panels" listed in this table included cleaned and degreased aluminum, chromate treated aluminum, and two types of enamel painted aluminum. Stainless steel, steel, fiberglass, glass, and other materials tested similarly to the above.

It should be noted that the adhesive with organofunctional silane coupling agent tends to build adhesion over time, as demonstrated in the accelerated heat aging at 65.6° C. This effect compensates for some of the initial loss in adhesion.

Higher adhesion values may be achieved by those experienced in the art by varying the amounts of the acrylate microspheres and the latex acrylate. It is expected that thicker adhesive coatings will create higher adhesion values.

The unique combination of enhanced sheeting integrity, semi-permanent adhesion, and removability was easily demonstrated by a pressure washing test. An enclosed lens retroreflective construction with the new adhesive formulation was applied to white enameled panels and heated for seven days at 65.6° C. After heating, the panels were soaked in plain tap water for 24 hours. After the water soak, the panels were mounted at 45° with the sheeting edge 20.3 cm from the tip of a pressure wash nozzle with 15° fan spray pattern. Water temperature and pressure were adjusted to 20° C. and 8300 kPa. Spraying directly at the sheeting edge and cumulative spraying for 1, 5, 15, and 40 seconds for a total of 61 seconds, the sheeting edge did not lift on samples with greater than 0.05 g/cm² adhesive. Edge lifting [less than or equal to 3 mm] occurred on some samples with adhesive weight at or below 0.04 g/cm² and where the 90° peel was less than 0.4 kg/cm.

All sheeting samples removed clean and continuously when purposely stripped off at 90° to the substrate surface by first starting one corner with a sharp tool.

What is claimed is:

1. Removable retroreflective sheeting, comprising:
An array of retroreflective elements,
a specular reflective layer, and
a pressure sensitive adhesive layer adjacent the specular reflective layer, wherein the adhesive layer comprises an organofunctional coupling agent in a range between 1 and 3% by weight, the adhesion of the adhesive layer exceeding 0.3 kg/cm width when a 2.5 cm strip is peeled at a rate of 30 cm/minute and at a 90 degree angle.

2. The sheeting of claim 1, wherein the sheeting adheres sufficiently strongly to a substrate under normal use conditions, yet permits clean removal from the substrate with hand peel forces.

3. The sheeting of claim 1, wherein the sheeting is of the enclosed lens type.

4. The sheeting of claim 1, wherein the sheeting is of the prismatic type.

5. The sheeting of claim 1, wherein the pressure sensitive adhesive layer is between 0.01 and 0.12 mm thick.

6. The sheeting of claim 1, wherein the pressure sensitive adhesive layer further comprises polymer microspheres.

7. The sheeting of claim 6, wherein the polymer microspheres comprise one or more interior voids containing a central cavity having an average apparent diameter of at least 10% of the average diameter of the microsphere.

8. The sheeting of claim 1, wherein the coupling agent comprises a silane coupling agent.

9. The sheeting of claim 1, wherein the pressure sensitive adhesive layer comprises less than 50% by weight polymer microspheres.

10. The sheeting of claim 6, wherein the pressure sensitive adhesive layer comprises between 10 and 40% by weight of the polymer microspheres.

11. The sheeting of claim 1, wherein the sheeting has a minimum peel strength of 0.3 kg/cm width at a rate of 30 cm/min.

12. The sheeting of claim 1, wherein the coupling agent is selected from the group consisting of 3-glycidoxypropyltrimethoxysilane, 3-mercaptopropyltrimethoxysilane, 3-aminopropyltriethoxysilane, 3-aminopropyltrimethoxysilane, 3-methacryloxypropyltrimethoxysilane, and vinyltrimethoxysilane.

13. The sheeting of claim 1, wherein the coupling agent is selected from the group consisting of silane, aluminate, zircoaluminate, zirconate, and titanate coupling agents.

14. The sheeting of claim 1, wherein the sheeting is adapted for use as advertising sheeting for vehicles, storage boxes, and storefronts.

15. The sheeting of claim 3, wherein the sheeting comprises:
a light transmissible topcoat layer;
a light transmissible bead bond layer;
a monolayer of light transmissible microsphere lenses embedded in the light transmissible bead bond layer;
an optional light transmissible space coat applied to the back surfaces of the microsphere lenses in such a way as to generally follow the curved surface of the back of the microsphere lenses;
a specularly reflective layer; and
a layer of pressure sensitive adhesive comprising an organofunctional coupling agent covering the specularly reflective layer.

16. The sheeting of claim 15, wherein the coupling agent is selected from the group consisting of 3-glycidoxypropyltrimethoxysilane,
3-mercaptopropyltrimethoxysilane,
3-aminopropyltriethoxysilane,
3-aminopropyltrimethoxysilane,
3-methacryloxypropyltrimethoxysilane, and vinyltrimethoxysilane.

17. The sheeting of claim 1 wherein the specular reflective layer comprises metal having a thickness of about 50 to 120 nm.

18. The sheeting of claim 17 wherein the specular reflective layer comprises aluminum.

19. Removable sheeting, comprising:

A backing layer comprising light transmissive material, a specular reflective layer, and a pressure sensitive adhesive layer adjacent the specular reflective layer, wherein the adhesive layer comprises an organofunctional coupling agent in a range between 1 and 3% by weight, the adhesion of the adhesive layer exceeding 0.3 kg/cm width when a 2.5 cm strip is peeled at a rate of 30 cm/minute and at a 90 degree angle.

20. The sheeting of claim 19, wherein the pressure sensitive adhesive layer comprises between 0.25 and 3% by weight of a silane coupling agent selected from the group consisting of 3-glycidoxypropyltrimethoxysilane, 3-mercaptopropyltrimethoxysilane, 3aminopropyltriethoxysilane, 3-aminopropyltrimethoxysilane, 3-methacryloxypropyltrimethoxysilane, and vinyltrimethoxysilane.

21. The sheeting of claim 19 wherein the specular reflective layer comprises metal having a thickness of about 50 to 120 nm.

22. The sheeting of claim 21 wherein the specular reflective layer comprises aluminum.

\* \* \* \* \*

UNITED STATES PATENT AND TRADEMARK OFFICE
CERTIFICATE OF CORRECTION

PATENT NO.    : 6,548,164 B1                                              Page 1 of 1
DATED         : April 15, 2003
INVENTOR(S)   : Bacon, Chester A. Jr.

It is certified that error appears in the above-identified patent and that said Letters Patent is hereby corrected as shown below:

<u>Column 1,</u>
Line 4, "APPLICANT" should be -- APPLICATION --.
Line 27, "sheeting" should be -- sheetings --.

<u>Column 2,</u>
Line 9, "climatic" should be -- climactic --.
Line 19, "scrapping" should be -- scraping --.

<u>Column 3,</u>
Line 29, insert -- , -- following ")".
Line 60, "," should be -- ; --.

<u>Column 6,</u>
Line 27, "form" should be -- from --.

<u>Column 8,</u>
Line 60, "climatic" should be -- climactic --.

<u>Column 10,</u>
Line 39, "sequent" should be -- subsequent --.
Line 52, "(cm$^2$)" should be -- (g/cm$^2$) --.

<u>Column 11,</u>
Line 4, "striping" should be -- stripping --.
Line 24, "pane" should be -- panel --.

<u>Column 14,</u>
Line 8, insert -- - -- following "3".

Signed and Sealed this

Seventh Day of October, 2003

JAMES E. ROGAN
*Director of the United States Patent and Trademark Office*